United States Patent
Matolia et al.

(10) Patent No.: US 12,302,230 B2
(45) Date of Patent: May 13, 2025

(54) MANUAL NETWORK SELECTION AT A USER EQUIPMENT

(71) Applicant: Apple Inc., Cupertino, CA (US)

(72) Inventors: Rohit R. Matolia, Surat (IN); Alosious Pradeep Prabhakar, Singapore (SG); Krisztian Kiss, Hayward, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 17/593,466

(22) PCT Filed: May 21, 2021

(86) PCT No.: PCT/US2021/070592
§ 371 (c)(1),
(2) Date: Sep. 19, 2021

(87) PCT Pub. No.: WO2021/237247
PCT Pub. Date: Nov. 25, 2021

(65) Prior Publication Data
US 2022/0312306 A1    Sep. 29, 2022

(30) Foreign Application Priority Data
May 22, 2020 (IN) .............................. 202041021678

(51) Int. Cl.
*H04W 48/18* (2009.01)
*H04W 8/18* (2009.01)
(Continued)

(52) U.S. Cl.
CPC ........... *H04W 48/18* (2013.01); *H04W 8/183* (2013.01); *H04W 60/04* (2013.01); *H04W 84/042* (2013.01)

(58) Field of Classification Search
None
See application file for complete search history.

(56) References Cited

U.S. PATENT DOCUMENTS

| | | |
|---|---|---|
| 2012/0190361 A1 | 7/2012 | Shaikh et al. |
| 2013/0217391 A1 | 8/2013 | Klatt et al. |
| (Continued) | | |

FOREIGN PATENT DOCUMENTS

| | | | |
|---|---|---|---|
| WO | 2020/072657 | 4/2020 | |
| WO | WO-2021195075 A1 * | 9/2021 | ............ H04W 12/06 |

OTHER PUBLICATIONS

3GPP, "Technical Specification Group Core Network and Terminals; Non-Access-Stratum (NAS) functions related to Mobile Station (MS) in idle mode (Release 16)", vol. CT WG1, No. V16.5.0, Mar. 27, 2020, 80 sheets.
(Continued)

*Primary Examiner* — Yaotang Wang
(74) *Attorney, Agent, or Firm* — Fay Kaplun & Marcin, LLP

(57) ABSTRACT

A user equipment (UE) displays a list of available networks for manual network selection. The UE detects multiple networks during a public land mobile network (PLMN) scan, wherein the multiple networks include one or more PLMNs and one or more stand-alone non-public networks (SNPNs), generates a manual network selection list that includes at least i) the one or more PLMNs or ii) the one or more SNPNs, determines a sequence in which entries of the manual network selection list are to be displayed at the UE, displays a graphical user interface (GUI) that includes a representation of the manual network selection list and registers with one of the multiple networks in response to user input.

20 Claims, 6 Drawing Sheets

(51) Int. Cl.
*H04W 60/04* (2009.01)
*H04W 84/04* (2009.01)

(56) References Cited

U.S. PATENT DOCUMENTS

| | | | |
|---|---|---|---|
| 2017/0164270 A1* | 6/2017 | Jiang | H04W 48/16 |
| 2019/0357095 A1* | 11/2019 | Pakniat | H04W 36/0083 |
| 2021/0258869 A1* | 8/2021 | Di Girolamo | H04B 17/318 |
| 2023/0069252 A1* | 3/2023 | Zhu | H04W 48/16 |

OTHER PUBLICATIONS

China Telecom, "On Private Network Support for NG-RAN", 3GPP RAN WG3, R3-193832, Aug. 16, 2019, 7 sheets.

* cited by examiner

MANUAL NETWORK SELECTION AT A USER EQUIPMENT

BACKGROUND

Manual network selection generally refers to a procedure in which a user equipment (UE) attempts to connect to a particular public land mobile network (PLMN) or Stand-alone Non-Public Network (SNPN) in response to user input. To provide an example, the UE may perform a PLMN search and detect multiple PLMNs deployed within the vicinity of the UE. The UE may then present the user with a list of available PLMNs. The user may select one of the PLMNs from the list and in response, the UE may attempt to register with the selected PLMN. If the user selects a PLMN that does not support a particular feature (e.g., type of network service, radio access technology (RAT), UE capability, etc.), the UE may experience instances of no service or limited service. Accordingly, manual network selection may have a direct impact on the user experience at the UE.

SUMMARY

Some exemplary embodiments are related to a method performed by a user equipment (UE). The method includes detecting multiple networks during a public land mobile network (PLMN) scan, wherein the multiple networks include one or more PLMNs and one or more stand-alone non-public networks (SNPNs), generating a manual network selection list that includes at least i) the one or more PLMNs or ii) the one or more SNPNs, determining a sequence in which entries of the manual network selection list are to be displayed at the UE, displaying a graphical user interface (GUI) that includes a representation of the manual network selection list and registering with one of the multiple networks in response to user input.

Other exemplary embodiments are related to a user equipment (UE) having a transceiver and a processor. The transceiver is configured to perform a public land mobile network (PLMN) scan. The processor is configured to detect multiple networks during the PLMN scan, wherein the multiple networks include one or more PLMNs and one or more stand-alone non-public networks (SNPNs), generate a manual network selection list that includes at least i) the one or more PLMNs or ii) the one or more SNPNs, determine a sequence in which entries of the manual network selection list are to be displayed at the UE, display a graphical user interface (GUI) that includes a representation of the manual network selection list, and register with one of the multiple networks in response to user input.

DETAILED DESCRIPTION

Figure 1:
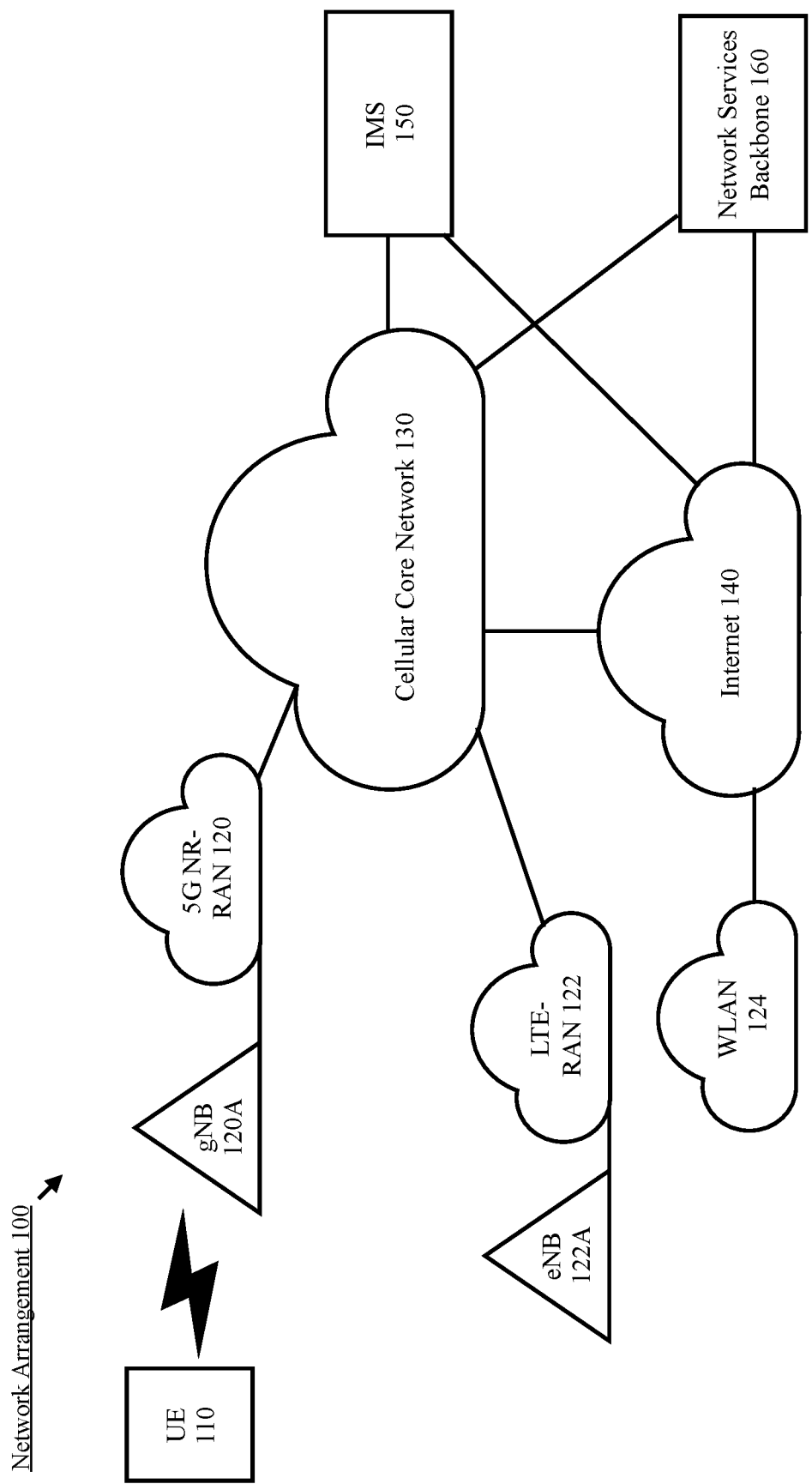
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to manual public land mobile network (PLMN) selection at a user equipment (UE).

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The UE may be equipped with manual network selection capability. Manual network selection generally refers to a procedure in which the UE attempts to connect to a particular PLMN/SNPN in response to user input. To provide an example, the UE may present the user with an option to select between multiple different PLMNs. The user may select one of the PLMNs via user input and in response, the UE may attempt to connect to the selected PLMN. However, reference to manual network selection is merely provided for illustrative purposes, different entities may refer to a similar concept by a different name.

A manual network selection procedure may include presenting the user with a manual network selection list. Throughout this description, the term "manual network selection list" refers to a dataset that includes one or more PLMNs/SNPNs that may be selected by the user during a manual network selection procedure. The exemplary embodiments describe techniques for determining which PLMNs are to be included in the manual network selection list and how the entries of the manual network selection list may be ordered. However, any reference to a "manual network selection list" is merely provided for illustrative purposes. Different entities may refer to a similar concept by a different name. Further, although various examples describe the manual network selection list being displayed locally at the UE, the exemplary embodiments are not limited to presenting the manual network selection list to the user in this manner. The exemplary embodiments may apply to this type of dataset being presented to the user using any appropriate means and in any appropriate format.

From the perspective of the UE, there may be multiple different types of PLMNs/SNPNs. As will be described in more detail below, the type of PLMN/SNPN may provide the basis for the UE to determine whether a particular PLMN/SNPN is to be included in the manual network selection list and/or the order in which the PLMNs/SNPNs are to be arranged within the manual network selection list. The UE may characterize a type of PLMN/SNPNs based on any of a variety of different aspects. However, any reference to a particular type of PLMN/SNPNs is merely provided for illustrative purposes. Different entities may refer to similar concepts by different names.

One type of PLMN is a home PLMN (HPLMN). A HPLMN may refer to a network operated by a network carrier with which the UE and/or user thereof is subscribed to receive network services. The network carrier of the UE may partner with other network carriers to ensure that the UE receives network services when the UE is outside the HPLMN coverage area. This type of PLMN may be considered an equivalent HPLMN (EHPLMN) or an equivalent PLMN (EPLMN). Although similar, those skilled in the art will understand the distinction between an EHPLMN and an EPLMN. Alternatively, a forbidden PLMN (FPLMN) may refer to a PLMN with which the network carrier of the UE does not have a valid agreement to access.

Another type of PLMN is a registered PLMN (RPLMN). RPLMN may refer to either a currently registered PLMN or a PLMN with which the UE was previously successful in registering. Other types of PLMNs include a user controlled PLMN (UPLMN), an operator controlled PLMN (OPLMN) and a preferred PLMN (PPLMN). The UPLMN may refer to a PLMN preferred by the user and an OPLMN may refer to a PLMN preferred by the network carrier. Both the OPLMN and the UPLMN may also be referred to as a PPLMN. Those skilled in the art will understand the scope of the above referenced terms (e.g., EHPLMN, EPLMN, FPLMN, RPLMN, PPLMN, UPLMN and OPLMN) and how they are distinct from one another.

PLMNs may also be characterized based on the type of feature (e.g., type of network service, radio access technology (RAT), UE capability, etc.) supported by the PLMN. For example, if a PLMN supports non-standalone mode for 5G (NSA) and does not support standalone mode for 5G (SA), the PLMN may be characterized as an NSA PLMN. Similarly, if the PLMN supports SA mode and does not support NSA mode, the PLMN may be characterized as a SA PLMN. In another example, a long term evolution (LTE) PLMN may refer to a PLMN that supports LTE RAT as its highest order RAT. In some embodiments, instead of being characterized by the highest order RAT, the UE may store an indication of the one or more RATs supported by the corresponding PLMN.

As will be described below, the type of PLMN may provide the basis for the UE to determine whether a particular PLMN is to be included in the manual network selection list and/or the order in which the PLMNs are to be arranged within the manual network selection list. The manual network selection list may also include one or more stand-alone non-public networks (SNPNs). Those skilled in the art will understand that a SNPN generally refers to a 5G system deployed for non-public use that does not rely on the network functions of a PLMN. Therefore, in some scenarios, a manual network selection procedure may include a user selecting an SNPN and in response, the UE attempting to connect to the SNPN.

As indicated above, the exemplary embodiments include techniques for managing the manual network selection list. In one aspect, this may include determining which PLMNs (or SNPNs) are to be included in the manual network selection list. In a second aspect, this may include determining how to arrange or sequence the entries of the manual network selection list. Various exemplary techniques for managing the manual network selection list will be described in detail below. These exemplary techniques may be used in conjunction with other currently implemented manual network selection list management techniques, future implementations of manual network selection list management techniques or independently from other manual network selection list management techniques.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The base stations (e.g., the gNB 120A, the eNB 122A) may include one or more communication interfaces to exchange data and/or information with camped UEs, the corresponding RAN, the cellular core network 130, the internet 140, etc. Those skilled in the art will understand that any association procedure may be performed for the UE 110 to connect to the RANs 120, 122. For example, as discussed above, the 5G NR-RAN 120 may be associated with a particular cellular service provider where the UE 110 and/or the user thereof has a contract and credential information (e.g., stored on a subscriber identify module (SIM) card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5G NR-RAN 120). As mentioned above, the use of the 5G NR-RAN 120 is for illustrative purposes and any type of network may be used.

The use of a separate 5G NR-RAN 120 and LTE-RAN 122 is merely provided for illustrative purposes. An actual network arrangement may include a RAN that includes architecture that is capable of providing both 5G NR RAT and LTE RAT services. For example, a next-generations radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
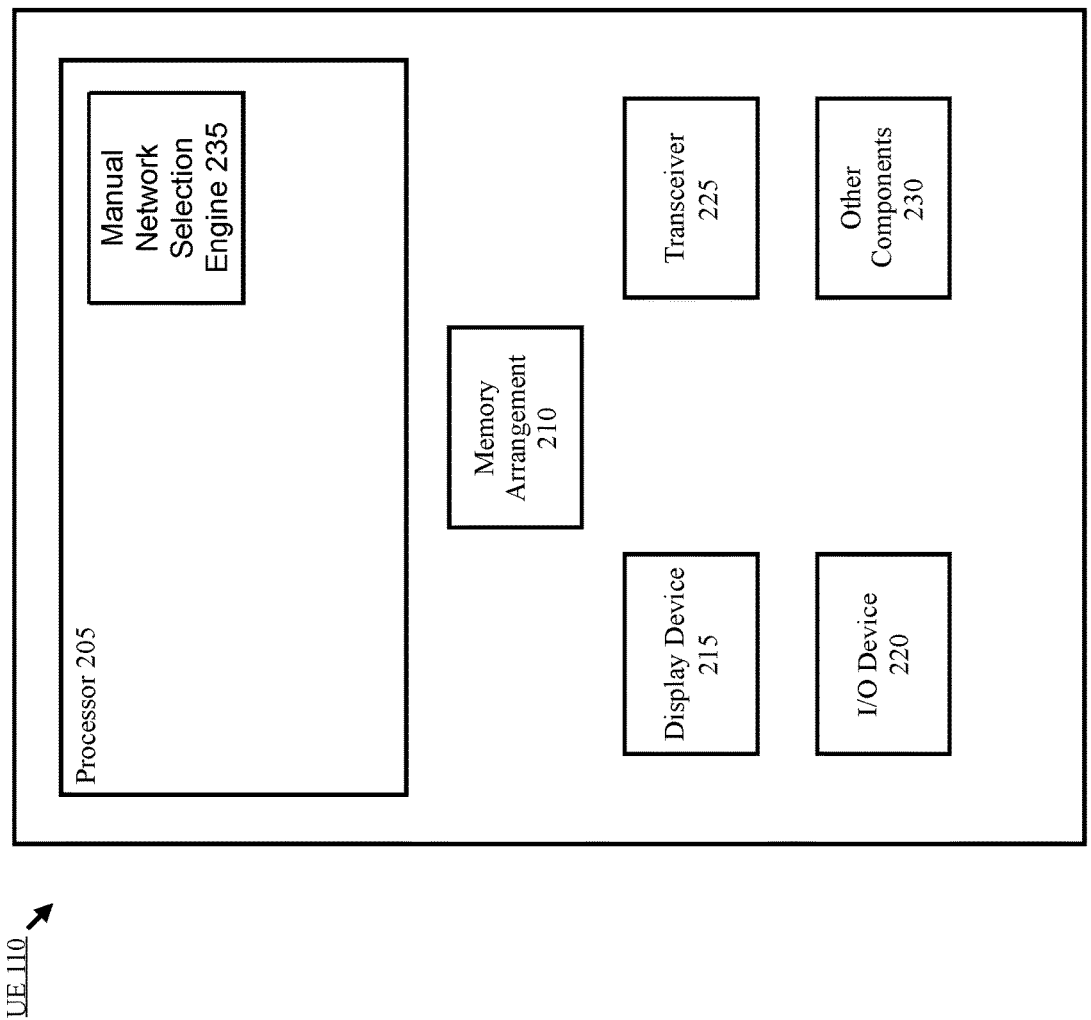
FIG. 2 shows an exemplary user equipment (UE) according to various exemplary embodiments.

FIG. 2 shows an exemplary user equipment (UE) 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, a SIM card, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include a manual network selection list management engine 235. The manual network selection list management engine 235 may perform various operations related to compiling and arranging the manual network selection list.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 1120 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
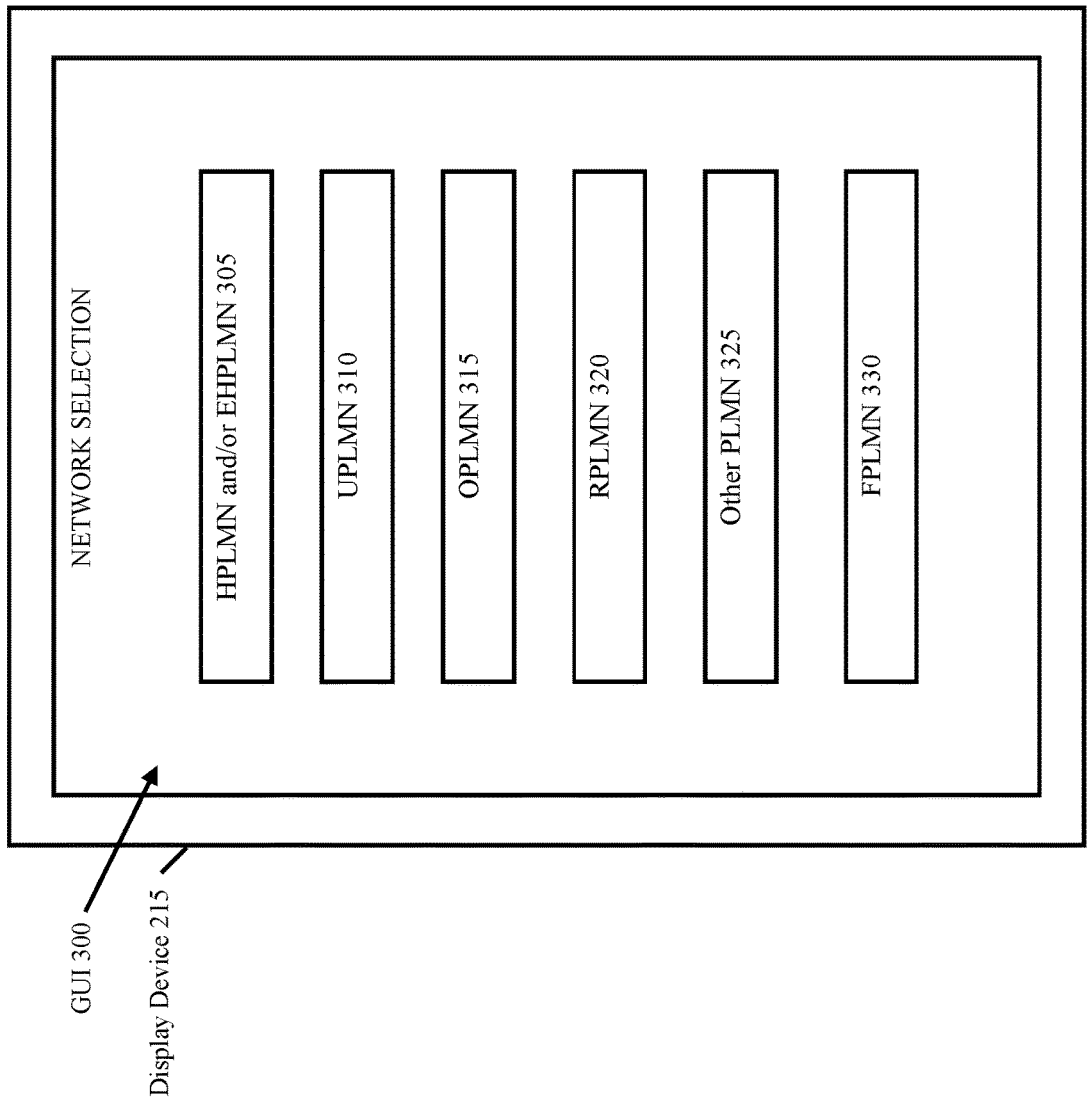
FIG. 3 shows an exemplary graphical user interface (GUI) that includes a representation of a manual public land mobile network (PLMN) selection list according to various exemplary embodiments.

FIG. 3 shows an exemplary graphical user interface (GUI) 300 that includes a representation of a manual network selection list according to various exemplary embodiments. This example describes a general overview of how the UE 110 may display a representation of the manual network selection list to the user. Specific examples of how the UE 110 may compile and arrange the manual network selection list will be provided below after the description of FIG. 3.

The display device 215 of the UE 110 may be configured to display the GUI 300 during a manual network selection procedure. Generally, when a manual network selection list is displayed at the UE 110, the user is most likely to select one of the PLMNs located towards the top of the GUI 300. Therefore, the UE 110 may prioritize the order of PLMNs that are to be displayed to ensure an adequate user experience.

In this example, the GUI 300 includes six entries 305-330. The first entry 305 may represent a set PLMNs that may include a HPLMN and one or more EHPLMNs. Since these types of PLMNs are most likely to provide the best user experience, the UE 110 may prioritize these types of PLMNs over other types of PLMNs. The second entry 310 may represent a set of PLMNs that may include one or more UPLMNs. Since the UPLMNs are preferred by the user, the UE 110 may prioritize these UPLMNs over the remaining types of available PLMNs. The third entry 315 may represent a set of PLMNs that may include one or more OPLMNs. The fourth entry 320 may represent a set of PLMNS that may include one or more RPLMNs that were not a part of any of the previous entries 305-315. Since the UE 110 has already successfully attached to the RPLMNs, the UE 110 may prioritize RPLMNs over the remaining types of available PLMNs because it is likely that UE 110 will be able to once again successfully attach to an RPLMN. The fifth entry 325 may represent a set of PLMNs that may include other types of PLMNs that do not satisfy the criteria of the previous entries 305-320. The sixth entry 330 may represent a set of PLMNs that may include one or more FPLMNs (temporary followed by permanent forbidden). The PLMNs included within each the entries may be sequenced in decreasing order of signal quality and/or RAT order followed by respective EPLMN (if available).

Although the UE 110 may not be able to receive most network services when camped on an FPLMN, the UE 110 may still be configured to consider FPLMNs when generating the manual network selection list. In one aspect, this may ensure that FPLMNs are not presented towards the start of the sequence of PLMNs in the manual network selection list. As a result, the user is less likely to select a FPLMN. However, there may also be other reasons for considering FPLMs when generating the manual network selection list. For example, the UE 110 may still able to connect to an FPLMN to perform an emergency call and/or receive access to other types of emergency services. Thus, the inclusion of FPLMNs in the manual network selection list may enable access to emergency services. Further, inclusion of the FPLMNs may also serve to limit end user confusion by indicating the presence of a network carrier that the user expects to be present at the current location.

The GUI 300 is described as sequencing the PLMNs included in the manual network selection list based on one or more priority factors (e.g., type of PLMN, signal quality, RAT, etc.). However, throughout this description, any reference to a particular priority factor being weighted more than another priority factor is merely provided for illustrative purposes. The UE 110 may assign any appropriate weight to any priority factor when determining the sequence of PLMNs (or SNPNs) within the manual network selection list.

From the perspective of the user, the GUI 300 may include multiple PLMN identifiers, e.g., a name, a PLMN ID, a mobile country code (MCC), a mobile network code (MNC), a type of PLMN or any combination thereof. Thus, in an actual operating scenario, each entry 305-330 of the GUI 300 may include one or more PLMN identifiers each identifying a different PLMN. Further, although not pictured in FIG. 3, the GUI 300 may also be configured to include an indication of the highest order RAT supported by a particular PLMN.

Figure 4:
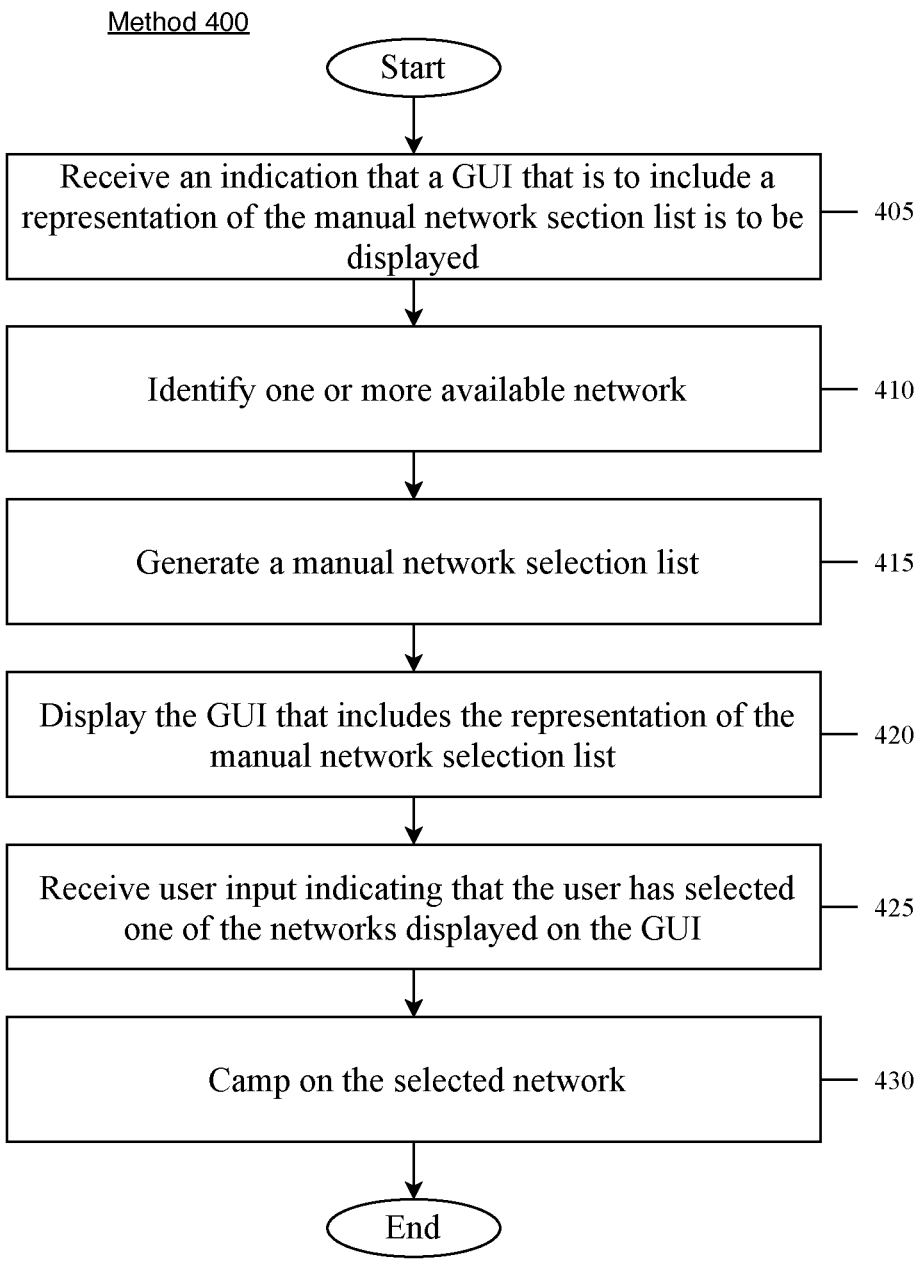
FIG. 4 shows a method for a manual network selection procedure according to various exemplary embodiments.

FIG. 4 shows a method 400 for a manual network selection procedure according to various exemplary embodiments. The method 400 will be described with regard to the network arrangement of FIG. 1 and the UE 110 of FIG. 2.

The manual network selection procedure may be performed in a variety of different scenarios. For example, the manual network selection procedure may be performed after powering on the UE 110 and prior to the UE 110 attempting to register with a PLMN/SNPN. In another example, the UE 110 may be camped on a particular PLMN while roaming (e.g., not connected to the HPLMN). However, the currently camped PLMN does not support a RAT higher than a legacy RAT (e.g., 2G, 3G, etc.). The user may notice that the UE 110 appears to be stuck on the legacy RAT and thus, may initiate the manual network selection procedure. In a further example, the UE 110 may initiate the manual network selection procedure based on identifying one or more conditions relative to the UE 110 and/or the network. These examples are merely provided for illustrative purposes and are not intended to limit the exemplary embodiments in any way. The exemplary techniques described herein may apply to a manual network selection procedure that initiated in any appropriate manner.

In 405, the UE 110 receives an indication that a GUI that is to include a representation of the manual network selection list is to be displayed. As indicated above, the user may initiate the manual network selection procedure. In some embodiments, this may include the user navigating through one or more GUIs related to UE 110 operating settings. In other embodiments, this may include the UE 110 identifying one or more conditions and in response, displaying a dialog box asking if the user would like to initiate manual network selection. Thus, user input may indicate to the UE 110 (e.g., the manual network selection list management engine 235) that a manual network selection procedure has been initiated and a manual network selection list is to be displayed at the display device 225 of the UE 110.

In other embodiments, the UE 110 may automatically initiate the manual network selection procedure. For example, the UE 110 may identify a predetermined condition. This may trigger the UE 110 to automatically initiate the manual network selection procedure and display the manual network selection list.

In 410, the UE 110 identifies one or more available PLMNs. For example, the UE 110 may perform a PLMN search by tuning its transceiver 225 to various frequencies and monitoring for indications of different PLMNs deployed within the vicinity of the UE 110. Therefore, in some scenarios, the manual network selection list may be generated based on PLMN search results.

The manual network selection procedure is not required to include a PLMN search. For example, there may be a scenario in which a PLMN search was recently performed and a further PLMN search is unnecessary. In another example, an indication of one or more available PLMNs may be received from the network. In a further example, the UE 110 may operate at a particular location multiple times and store indications of available PLMNs relative to this location. Thus, there may be scenarios in which the UE 110 forgoes performing a PLMN search and instead, identifies one or more available PLMNs by collecting information from any other appropriate source.

As mentioned above, the UE 110 may be configured to connect to an SNPN. Therefore, in some embodiments, identifying one or more available PLMNs may include identifying one or more available SNPNs.

In 415, the UE 110 generates a manual network selection list. The manual network selection list may be generated, at least in part, based on the one or more PLMNs identified in 410. The manual network selection list may also be generated using one or more rules. In a first aspect, the rules may relate to the type of PLMNs (or SNPNs) that are to be presented to the user during the manual network selection procedure. In a second aspect, the rules may relate to how the sequence of PLMNs (or SNPNs) are to be ordered within the GUI. These rules may be preloaded onto the UE 110, received from the network in any appropriate type of message or derived from any other appropriate source. Specific examples of rules are provided below.

Like the GUI 300 of FIG. 3, in this example, the manual network selection list is described as being displayed in descending order of priority. However, the exemplary embodiments are not limited to arranging the PLMNs in this manner and any appropriate type of priority indication may be utilized.

In some embodiments, one or more rules may be directed towards SNPN functionality. For example, the UE 110 may be authorized to only directly connect to SNPNs. In this type of scenario, it may not be helpful to include PLMNs in the manual network selection list because the UE 110 may not be able to successfully register with a selected PLMN. Thus, one exemplary rule may be to exclude PLMNs from the manual network selection list when the UE 110 is authorized to only directly connect to SNPNs. In another example, the UE 110 may be authorized to only directly connect to PLMNs. In this type of scenario, it may not be helpful to include SNPNs in the manual network selection list because the UE 110 may not be able to successfully register with the selected SNPN. Thus, one exemplary rule may be to exclude SNPNs from the manual network selection list when the UE 110 is authorized to only directly connect to PLMNs.

In further embodiments, the UE 110 may be authorized to connect to both SNPNs and PLMNs. In this type of scenario, it may be helpful to include both SNPNs and PLMNs in the manual network selection list. Specific examples of generating the manual network selection list using one or more rules related to SNPN functionality will described in more detail below with regard to the method 500 of FIG. 5.

In other embodiments, one or more rules may be directed towards SA mode and NSA mode. For example, the UE 110 may be configured to support SA mode and not NSA mode (e.g., an ultra-reliable low latency communication (URLLC) device, an industrial IoT (IIoT) device, etc.). In this type of scenario, one exemplary rule may be to exclude NSA PLMNs from the manual network selection list. Alternatively, if the UE 110 supports NSA mode and not SA mode, one exemplary rule may be to exclude SA PLMNs from the manual network selection list.

The UE 110 may differentiate between SA PLMNs and NSA PLMNs using any appropriate technique. In one example, the UE 110 may determine that a particular PLMN is an NSA PLMN based on the availability of system information block 1 (SIB1). Since NSA PLMN cells may not provide a standalone SIB1 broadcast, the UE 110 may assume that the lack of SIB1 indicates that the PLMN is an NSA PLMN. In another example, the UE 110 may determine whether a particular PLMN is an NSA PLMN based on information transmitted over a public broadcast channel (PBCH) corresponding to a cell of that PLMN.

Instead of excluding NSA PLMNs or SA PLMNs from the manual network selection list, one exemplary rule may be that SA PLMNs are prioritized over NSA PLMNs (or vice versa). For example, the UE 110 may differentiate between SA PLMNs and NSA PLMNs using the techniques mentioned above or any appropriate technique. The UE 110 may then utilize this information when determining the sequence with which to order the available PLMNs when presenting the manual network selection list to the user.

Continuing with the example described with regard to the GUI 300 of FIG. 3, there may be various rules for prioritizing PLMNs on the basis of type of PLMN. For example, one exemplary rule may be to assign a certain weight to HPLMNs and/or EHPLMNs. The UE 110 may identify whether a detected PLMN is the HPLMN or an EHPLMN based on information stored on the SIM or from any other appropriate source. In the GUI 300, HPLMNs and/or EHPLMNs are assigned the highest weight of the entries 305-330. Thus, if an HPLMN and/or an EHPLMN is identified as an available PLMN, the HPLMN and/or EHPLMN may be included in the sequence of PLMNs before the other types of PLMNs. In some embodiments, the HPLMNs and/or EHPLMNs may be ordered amongst themselves based on signal quality and/or supported RATs followed by their respective EPLMN.

Another exemplary rule may be to assign a certain weight to UPLMNs. The UE 110 may identify whether a detected PLMN is a UPLMN based on the user controlled PLMN selector with access technology stored data file on the SIM or from any other appropriate source. In the GUI 300, UPLMNs are assigned the second highest weight of the entries 305-330. Thus, if a UPLMN is identified as an available PLMN, the UPLMN may be included in the sequence of PLMNs after the HPLMNs and/or EHPMNs and before the other types of PLMNs. In some embodiments, the UPLMNs may be ordered amongst themselves based on signal quality and/or supported RATs.

Another exemplary rule may be to assign a certain weight to OPLMNs. The UE 110 may identify whether a detected PLMN is an OPLMN based on the operator controlled PLMN selector with access technology data file stored on the SIM or from any other appropriate source (e.g., steering of roaming indication/container from network). In the GUI 300, OPLMNs are assigned the third highest weight of the entries 305-330. Thus, if a OPLMN is identified as an available PLMN, the OPLMN may be included in the sequence of PLMNs after the HPLMNs, EHPMNs and the UPLMNs and before the other types of PLMNs. In some embodiments, the OPLMNs may be ordered amongst themselves based on signal quality and/or supported RATs.

Another exemplary rule may be to assign a certain weight to RPLMNs/access technology combinations which were successfully registered upon. In some embodiments, the UE 110 may only assign this weight if the RPLMN is part of the above reference entries 305-315 (e.g., HPLMN, EHPLMNs, UPLMNs, OPLMNs). The UE 110 may identify whether a detected PLMN is an RPLMN based on any appropriate source. In the GUI 300, RPLMNs are assigned the fourth highest weight of the entries 305-330. Thus, if an RPLMN is identified as an available PLMN, the RPLMN may be included in the sequence of PLMNs after the HPLMNs, EHPMNs, UPLMNs and the OPLMNs and before the other types of PLMNs. In some embodiments, the RPLMNs may be ordered amongst themselves based on signal quality and/or supported RATs followed by their respective EPLMN.

Another exemplary rule may be to assign a certain weight to PLMNs that do not satisfy the criteria of the other entries 305-320, 330. The UE 110 may utilize a threshold parameter (e.g., signal quality and/or RAT) to limit the inclusion of these types of PLMNs. In the GUI 300, these types of PLMNs are assigned the fifth highest weight of the entries 305-330. Thus, if this type of PLMN is identified as an available PLMN it may be included in the sequence of PLMNs after the HPLMNs, EHPMNs, UPLMNs, OPLMNs and the RPLMNs and before the FPLMNs. In some embodiments, the PLMNs that satisfy the threshold parameter may be ordered amongst themselves based on signal quality and/or supported RATs.

Another exemplary rule may be to assign a certain weight to FPLMNs. The UE 110 may identify whether a detected PLMN is a FPLMN based on any appropriate source. In the GUI 300, FPLMNs are assigned the lowest highest weight of the entries 305-330. Thus, if an FPLMN is identified as an available PLMN, the FPLMN may be included in the sequence of PLMNs after the HPLMNs, EHPMNs, UPLMNs, OPLMNs, RPLMNs and other PLMNs. In some embodiments, the FPLMNs may be ordered amongst themselves based on signal quality and/or supported RATs.

In 420, the UE 110 may display the GUI that includes the representation of the manual network selection list. As indicated above, the PLMNs (and/or SNPNs) may be displayed in a sequence of decreasing priority. For example, the PLMN that is determined to have the highest priority using the one or more exemplary rules is to be the first PLMN displayed at towards the top of the GUI, the PLMN that is determined to have the second highest priority using the one or more exemplary rules is to be displayed below the first PLMN and so on.

In 425, the UE 110 receives user input indicating that the user has selected one of the PLMNs displayed on the GUI. The user may select any PLMN included in the manual network selection list for any reason. If the UE 110 is equipped with a keypad, the selection may be indicated to the UE 110 via user input at the keypad. If the UE 110 is equipped with a touchscreen, the selection may be indicated to the UE 110 via user input at the touchscreen. However, the exemplary embodiments are not limited to any particular type of user input and the user may make this selection in any appropriate manner.

In 430, the UE 110 camps on the selected PLMN. Subsequently, the UE 110 may attempt to initiate a registration procedure with the PLMN.

Figure 5:
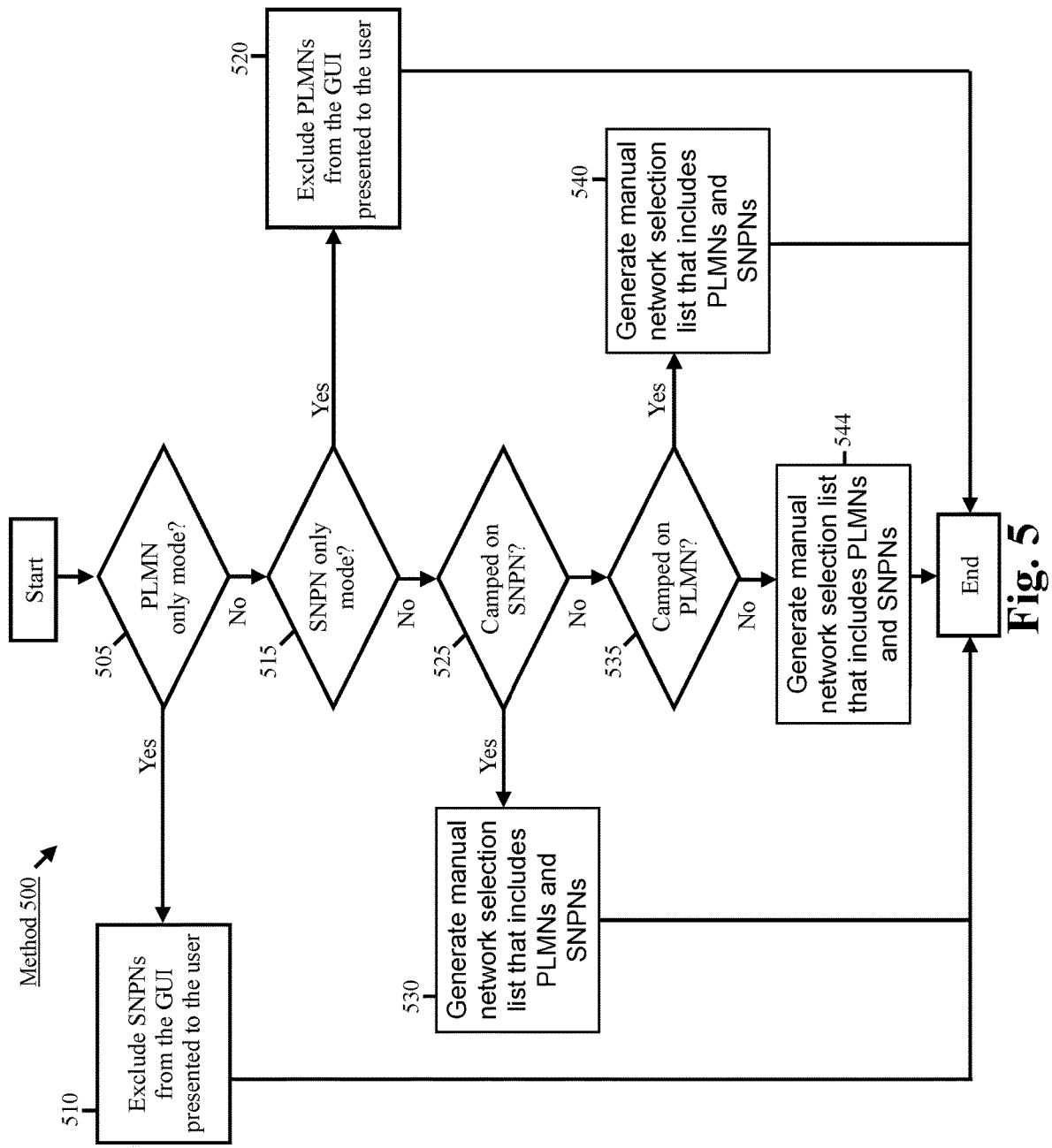
FIG. 5 shows a method for applying one or more rules related to stand-alone non-public network (SNPN) functionality when generating a manual network selection list according to various exemplary embodiments.

FIG. 5 shows a method 500 for applying one or more rules related to SNPN functionality when generating a manual network selection list according to various exemplary embodiments. The method 500 will be described with regard to the network arrangement 100 of FIG. 1, the UE 110 of FIG. 2 and the method 400 of FIG. 4.

The method 500 may take place during 415 of the method 400. Thus, the UE 110 may have already identified multiple available PLMNs. For example, the UE 110 may have performed a PLMN search and/or collected information from any other appropriate source.

In 505, the UE 110 determines if the UE 110 is operating in a PLMN only mode. In PLMN only mode, the UE 110 may be authorized to connect to PLMNs and not authorized to connect to SNPNs. If the UE 110 is operating in PLMN only mode, the method 500 continues to 510.

In 510, the UE 110 excludes SNPNs from the GUI presented to the user. For example, during operation, the UE 110 may differentiate between PLMNs and SNPNs based on a SIB or any other appropriate type of information. Since the UE 110 is operating in the PLMN only mode, the UE 110 may implement a rule when generating the manual network selection list that causes the UE 110 to exclude SNPNs from being included in the manual network selection list and/or displayed in the GUI. The manual network selection list may then be generated in accordance with any of the rules described above with regard to the method 400 or any other appropriate rule. Subsequently, the method 500 ends.

If the UE 110 is not operating in the PLMN only mode, the method 500 continues to 515. In 515, the UE 110 determines if the UE 110 is operating in a SNPN only mode. In SNPN only mode, the UE 110 may be authorized to connect to SNPNs and not authorized to directly connect to PLMNs. If the UE 110 is operating in SNPN only mode, the method 500 continues to 520.

In 520, the UE 110 excludes PLMNs from the GUI presented to the user. For example, during operation, the UE 110 may differentiate between PLMNs and SNPNs based on a SIB or any other appropriate type of information. Since the UE 110 is operating in the SNPN only mode, the UE 110 may implement a rule when generating the manual network selection list that causes the UE 110 to exclude PLMNs from being included in the manual network selection list and/or displayed in the GUI.

In this type of scenario, a currently camped SNPN and any SNPNs indicated in the SIM may be prioritized over other SNPNs. Thus, when generating the manual network selection list, currently camped SNPNs and any SNPNs indicated in the SIM may be included in the sequence of SNPNs presented to the user prior to any other SNPNs. Further, SNPNs whose display names are available at the UE 110 may be assigned the second highest priority amongst SNPNs. Thus, when generating the manual network selection list, SNPNs whose display names are available at the UE 110 may be included in the sequence of SNPNs presented to the user after currently camped SNPNs and any SNPNs indicated in the SIM and prior to any other SNPNs. The next highest priority may be assigned to SNPNs whose display names are not available at the UE 110. Thus, when generating the manual network selection list, SNPNs whose display names are not available at the UE 110 may be included in the sequence of SNPNs presented to the user after currently camped SNPNs, any SNPNs indicated in the SIM and SNPNs whose display names are available at the UE 110 and prior to any other SNPNs. The second lowest priority may be assigned to SNPNs that are included in a temporary forbidden list and the lowest priority may be assigned to SNPNs that are included in a permanent forbidden list. Subsequently, the method 500 ends.

At this time, since the UE 110 is not operating in either a PLMN only mode or an SNPN only mode, the UE 110 may be authorized to connect to either PLMNs or SNPNs. In 525, the UE 110 determines whether the UE 110 is currently camped on an SNPN. If the UE 110 is camped on an SNPN, the method 500 continues to 530.

In 530, the UE 110 may generate a manual network selection list that includes both SNPNs and PLMNs. In this type of scenario any appropriate rules may be utilized. To provide an example, the currently camped SNPN and any SNPNs indicated in the SIM may be assigned the highest weight, HPLMNs and/or EHPLMNs may be assigned the second highest weight, PPLMNs may be assigned the third highest weight, temporary forbidden SNPNs may be assigned the fourth highest weight, permanent forbidden SNPNs may be assigned the fifth highest weight and FPLMNs may be assigned the lowest weight. Thus, an ordered sequence of PLMNs and SNPNs may include, i) the currently camped SNPN and/or any SNPNs indicated in the SIM, ii) HPLMNs and/or EHPLMNs, iii) PPLMNs, iv) temporary forbidden SNPNs, v) permanent forbidden SNPNs and vi) FPLMNs.

If the UE 110 not camped on an SNPN, the method 500 continues to 535. In 535, the UE 110 determines whether the UE 110 is currently camped on a PLMN. If the UE 110 is camped on an PLMN, the method 500 continues to 540.

In 540, the UE 110 may generate a manual network selection list that includes both SNPNs and PLMNs. In this type of scenario any appropriate rules may be utilized. To provide an example, HPLMNs and/or EHPLMNs may be assigned the highest weight, any SNPNs indicated in the SIM may be assigned the second highest weight, PPLMNs may be assigned the third highest weight, FPLMNs may be assigned the fourth highest weight, temporary forbidden SNPNs may be assigned the fifth highest weight and permanent forbidden SNPNs may be assigned the lowest weight. Thus, an ordered sequence of PLMNs and SNPNs may include, i) HPLMNs and/or EHPLMNs, ii) any SNPNs indicated in the SIM, iii) PPLMNs, iv) FPLMNs, v) temporary forbidden SNPNs and vi) permanent forbidden SNPNs.

If the UE 110 is not currently camped on a PLMN, the method 500 continues to 545. At this time, the UE 110 is not currently camped on either a SNPN or a PLMN. In 545, the UE 110 may generate a manual network selection list that includes both SNPNs and PLMNs. In this type of scenario any appropriate rules may be utilized. For example, the UE 110 may consider signal quality when ordering the sequence of SNPNs and PLMNs. Subsequently, the method 500 ends.

In a further aspect, the exemplary embodiments relate to a manual network selection procedure that adapts to steering of roaming (SoR) information. SoR generally refers to a concept in which the HPLMN may attempt to direct the UE 110 towards a particular OPLMN while roaming. The HPLMN may perform SoR operations to manage the distribution of roaming subscribers (e.g., UEs) across visited networks. For example, the HPLMN may update the operator controlled PLMN selector with access technology list stored at the UE 110 by providing the UE 110 with SoR information. Accordingly, SoR information may include an indication of one or more OPLMNs. The SoR information may be provided to the UE 110 by the HPLMN during a registration procedure with a visited PLMN or after the UE 110 has registered with the visited PLMN.

If the SoR information is received before a representation of the manual network selection list is presented to the user, the UE 110 may consider both the one or more OPLMNs indicated in the SoR information (e.g. the new OPLMN list) and the one or more OPLMNs stored at the UE 110 prior to the reception of the SoR information (e.g., old OPLMN list). If the new OPLMN list is different than the old OPLMN list, the UE 110 may assign a higher weight to the new OPLMN list compared to the old OPLMN list. Thus, when arranging the sequence of PLMNs the UE 110 may prioritize the new OPLMNs over the old OPLMNs. In some embodiments, the old OPLMNs are still prioritized over at least FPLMNs.

If the SoR information is received during an ongoing PLMN search or while a representation of the manual network selection list is presented to the user, the UE 110 may update the manual network selection list to reflect the SoR information. For example, the UE 110 may update the manual network selection list after a universal SIM (USIM)/SIM application toolkit (SAT) refresh. In this type of scenario, updating the manual network selection list may include assigning a higher weight to the one or more OPLMNs indicated in the SoR information (e.g., new OPLMN list) compared to the one or more OPLMNs stored at the UE 110 prior to the reception of the SoR information (e.g., old OPLMN list). Thus, when arranging the sequence of PLMNs for the updated manual network selection list the UE 110 may prioritize the new OPLMN list over the old OPLMN list.

If the SoR information is received after a first manual network selection procedure, then the UE 110 may initiate a second manual network selection procedure. During the second manual network selection procedure, the UE 110 may assign a higher weight to the one or more OPLMNs indicated in the SoR information (e.g., new OPLMN list) compared to the one or more OPLMNs stored at the UE 110 prior to the reception of the SoR information (e.g., old OPLMN list). If the current RPLMN is included in the new OPLMN list, then the current RPLMN may be assigned the highest priority. However, if the current RPLMN is not included in the new OPLMN list, the weight assigned to the new OPLMN list may be higher than the weight assigned to the current RPLMN. Thus, when arranging the sequence of PLMNs for the manual network selection list for the second manual network selection procedure, the UE 110 may prioritize the new OPLMN list over both the old OPLMN list and the current RPLMN.

Figure 6:
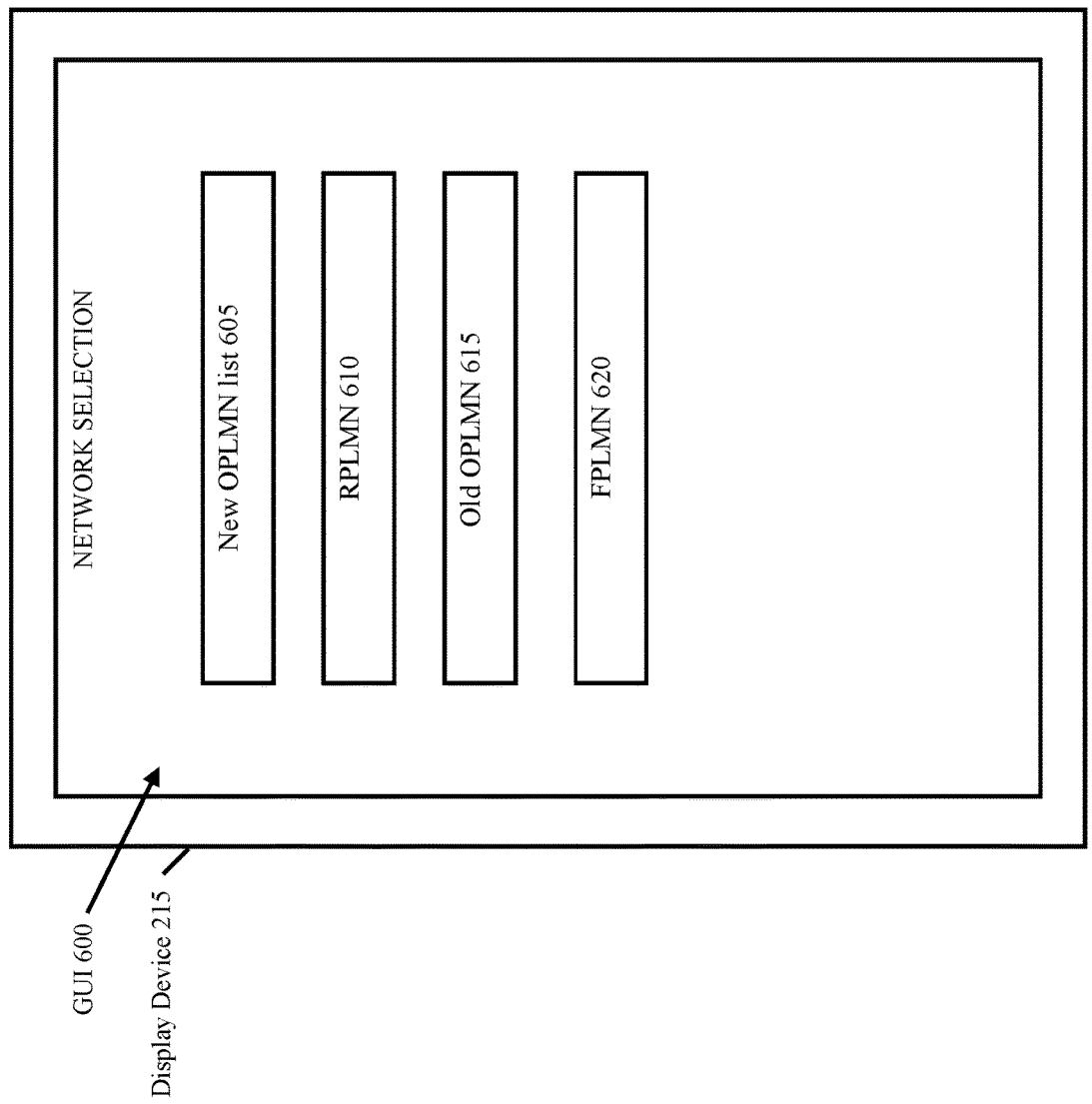
FIG. 6 shows an exemplary GUI that includes a representation of a manual network selection list generated during a manual network selection procedure that was triggered by steering of roaming (SoR) information.

FIG. 6 shows an exemplary GUI 600 that includes a representation of a manual network selection list generated during a manual network selection procedure that was triggered by SoR information. The GUI 600 illustrates how the manual network selection list may be presented to the user during the second manual network selection procedure mentioned above. In this example, the current RPLMN is not included in the new OPLMN list. Thus, the new OPLMN list may be prioritized over both the old OPLMN list and the current RPLMN.

A first entry 605 of the manual network selection list may include one or more PLMNs from the new OPLMN list. A second entry 610 of the manual network selection list may include the current RPLMN. A third entry 615 of the manual network selection list may include the old OPLMN list. A fourth entry 620 of the manual network selection list may include one or more FPLMNs. The manual network selection list for the second manual network selection procedure may be arranged in this manner to ensure that the user understand that the HPLMN wants to steer the user away from the current RPLMN. This may also help the user understand that the new OPLMN supports higher slices and/or services that may be utilized by the UE 110 while roaming.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a user equipment (UE):
      detecting multiple networks during a public land mobile network (PLMN) scan, wherein the multiple networks include a plurality of PLMNs and a plurality of stand-alone non-public networks (SNPNs);
      generating a manual network selection list that includes at least i) the plurality of PLMNs or ii) the plurality of SNPNs;
      determining a sequence in which entries of the manual network selection list are to be displayed at the UE, wherein networks are ordered within the sequence based on, at least, being previously successfully registered upon by the UE and supported Radio Access Technologies (RATs);
      displaying a graphical user interface (GUI) that includes a representation of the manual network selection list; and
      registering with one of the multiple networks in response to user input.

2. The method of claim 1, wherein the plurality of PLMNs are ordered within the sequence based on not being a home PLMN (HPLMN), an equivalent HPLMN (EHPLMN), a user controlled PLMN (UPLMN) or an operator controlled PLMN (OPLMN) for the UE.

3. The method of claim 2, wherein the UPLMN is a PLMN included in a user controlled PLMN selector with access technology list stored on a subscriber identity module (SIM) and the OPLMN is a PLMN included in an operator controlled PLMN selector with access technology list stored on the SIM.

4. The method of claim 2, wherein a further one of the plurality of PLMNs is ordered within the sequence based on being a forbidden PLMN (FPLMN) or an equivalent PLMN (EPLMN) to any of the OPLMN or the UPLMN.

5. The method of claim 2, further comprising:
   receiving steering of roaming (SoR) information from the HPLMN, wherein the SOR information includes one or more OPLMNs.

6. The method of claim 5, wherein the SoR information is received prior to the PLMN scan and wherein a first PLMN of the plurality of PLMNs is ordered within the sequence relative to a second PLMN of the plurality of PLMNs based on the first PLMN being indicated in the SoR information.

7. The method of claim 5, further comprising:
updating the sequence of the plurality of PLMNs based on the SoR information, wherein the SoR information is received while the GUI is displayed.

8. The method of claim 5, further comprising:
generating a further manual network selection list in response to receiving the SoR information, wherein the SoR information is received after the registering.

9. The method of claim 8, further comprising:
determining a further sequence in which the plurality of PLMNs are to be displayed at the UE within a representation of the further manual network selection list, wherein a first PLMN of the plurality of PLMNs is ordered within the further sequence relative to a second PLMN of the plurality of PLMNs based on the first PLMN being indicated in the SoR information.

10. The method of claim 1, further comprising:
identifying that a first PLMN of the plurality of PLMNs supports non-standalone (NSA) mode, wherein the UE is operating in standalone (SA) mode when generating the manual network selection list and wherein the manual network selection list does not include the first PLMN based on the UE operating in SA mode.

11. The method of claim 10, wherein identifying that the first PLMN supports NSA mode is based on at least one of (i) information transmitted over a physical broadcast channel (PBCH) or (ii) not receiving a system information block 1 (SIB1) from a cell of the first PLMN.

12. The method of claim 1, wherein the UE excludes the plurality of SNPNs from the manual network selection list based on operating in a PLMN only mode.

13. The method of claim 12, wherein the UE is not camped on a network when generating the manual network selection list and wherein the order of the sequence is based a signal parameter.

14. The method of claim 1, wherein the UE excludes the plurality of PLMNs from the manual network selection list based on operating in an SNPN only mode.

15. The method of claim 1, wherein the UE is camped on a first SNPN of the plurality of SNPNs when generating the manual network selection list and wherein the first SNPN is included in the sequence before the plurality of PLMNs based on the UE being camped on the first SNPN.

16. The method of claim 1, wherein the UE is camped on a first PLMN of the plurality of PLMNs when generating the manual network selection list and wherein one of the PLMNs is included in the sequence before the plurality of SNPNs based on the UE being camped on the first PLMN.

17. A user equipment (UE), comprising:
a transceiver configured to perform a public land mobile network (PLMN) scan; and
a processor configured to:
detect multiple networks during the PLMN scan, wherein the multiple networks include a plurality of PLMNs and a plurality of stand-alone non-public networks (SNPNs),
generate a manual network selection list that includes at least i) the plurality of PLMNs or ii) the plurality of SNPNs,
determine a sequence in which entries of the manual network selection list are to be displayed at the UE, wherein networks are ordered within the sequence based on, at least, being previously successfully registered upon by the UE, and supported Radio Access Technologies (RATs),
display a graphical user interface (GUI) that includes a representation of the manual network selection list, and
register with one of the multiple networks in response to user input.

18. The UE of claim 17, wherein the plurality of PLMNs are ordered within the sequence based not being a home PLMN (HPLMN), an equivalent HPLMN (EHPLMN), a user controlled PLMN (UPLMN) or an operator controlled PLMN (OPLMN) for the UE.

19. The UE of claim 17, wherein the processor is further configured to:
receive steering of roaming (SoR) information from the HPLMN, wherein the SOR information includes one or more OPLMNs; and
update the sequence of the one or more PLMNs based on the SoR information.

20. The UE of claim 17, wherein the processor is further configured to:
Identify that a first PLMN of the plurality of PLMNs supports non-standalone (NSA) mode, wherein the UE is operating in standalone (SA) mode when generating the manual network selection list and wherein the manual network selection list does not include the first PLMN based on the UE operating in SA mode,
wherein identifying that the first PLMN supports NSA mode is based on at least one of (i) information transmitted over a physical broadcast channel (PBCH) or (ii) not receiving a system information block 1 (SIB1) from a cell of the first PLMN.

* * * * *